US011946291B2

(12) United States Patent
Parsons et al.

(10) Patent No.: US 11,946,291 B2
(45) Date of Patent: Apr. 2, 2024

(54) CARRYING CASE FOR A PAIR OF TWO HANDCUFFS

(71) Applicant: Armament Systems and Procedures, Inc., Appleton, WI (US)

(72) Inventors: Kevin Parsons, Appleton, WI (US); Siu Ngai Wang, Kowloon (HK)

(73) Assignee: ARMAMENT SYSTEMS AND PROCEDURES, INC., Appleton, WI (US)

( * ) Notice: Subject to any disclaimer, the term of this patent is extended or adjusted under 35 U.S.C. 154(b) by 598 days.

(21) Appl. No.: 17/148,654

(22) Filed: Jan. 14, 2021

(65) Prior Publication Data

US 2022/0220779 A1 Jul. 14, 2022

(51) Int. Cl.
*E05B 75/00* (2006.01)

(52) U.S. Cl.
CPC .................................. *E05B 75/005* (2013.01)

(58) Field of Classification Search
CPC ..................................................... E05B 75/005
See application file for complete search history.

(56) References Cited

U.S. PATENT DOCUMENTS 1,517,588 A * 12/1924 Sasaki ..................... E05B 75/00 224/242
3,870,208 A * 3/1975 Theodore ................ E05B 75/00 224/675
4,852,784 A * 8/1989 Burton, Jr. .............. E05B 75/00 224/914
5,511,706 A * 4/1996 Hendrickson ........... A45F 5/021 224/667
8,522,581 B2 * 9/2013 Thompson .............. E05B 75/00 70/16
10,362,856 B2 * 7/2019 Parsons ................... A45F 5/021
11,053,713 B2 * 7/2021 Parsons ................. E05B 75/005
D985,258 S * 5/2023 Yan ................................ D3/215
2005/0115997 A1 * 6/2005 Nouvel De La Fleche ................ E05B 75/00 224/162
2020/0208443 A1 * 7/2020 Parsons ................. E05B 75/005
2023/0046489 A1 * 2/2023 Ivgi ....................... E05B 75/005

* cited by examiner

*Primary Examiner* — Christopher J Boswell
(74) *Attorney, Agent, or Firm* — Hahn Loeser & Parks LLP

(57) ABSTRACT

A carrying case for a pair of two handcuffs is described.

16 Claims, 8 Drawing Sheets

CARRYING CASE FOR A PAIR OF TWO HANDCUFFS

FIELD OF THE INVENTION

The invention generally relates to a carrying case for a pair of two handcuffs.

BACKGROUND AND SUMMARY

In general, a pair of two handcuffs comprises two handcuffs and a coupler. Each one of the two handcuffs comprises a lockset portion and an oval portion, the oval portion comprising a bow rotatably mounted between two cheek arms for encircling a wrist. The coupler connects the respective lockset portions of each one of the two handcuffs to each other. The coupler is typically two sets of hinges or a chain with two links. The present disclosure describes and claims a carrying case in which a pair of two handcuffs may be carried conveniently.

BRIEF DESCRIPTION OF THE DRAWINGS

While embodiments can take many different forms, specific embodiments are shown in the drawings and will be described with the understanding that the present disclosure is an exemplification of the principles of the present invention and the best mode of practicing it. No limitation to a specific embodiment illustrated is intended. The following drawings are not necessarily drawn to scale.

DETAILED DESCRIPTION

Figure 1:
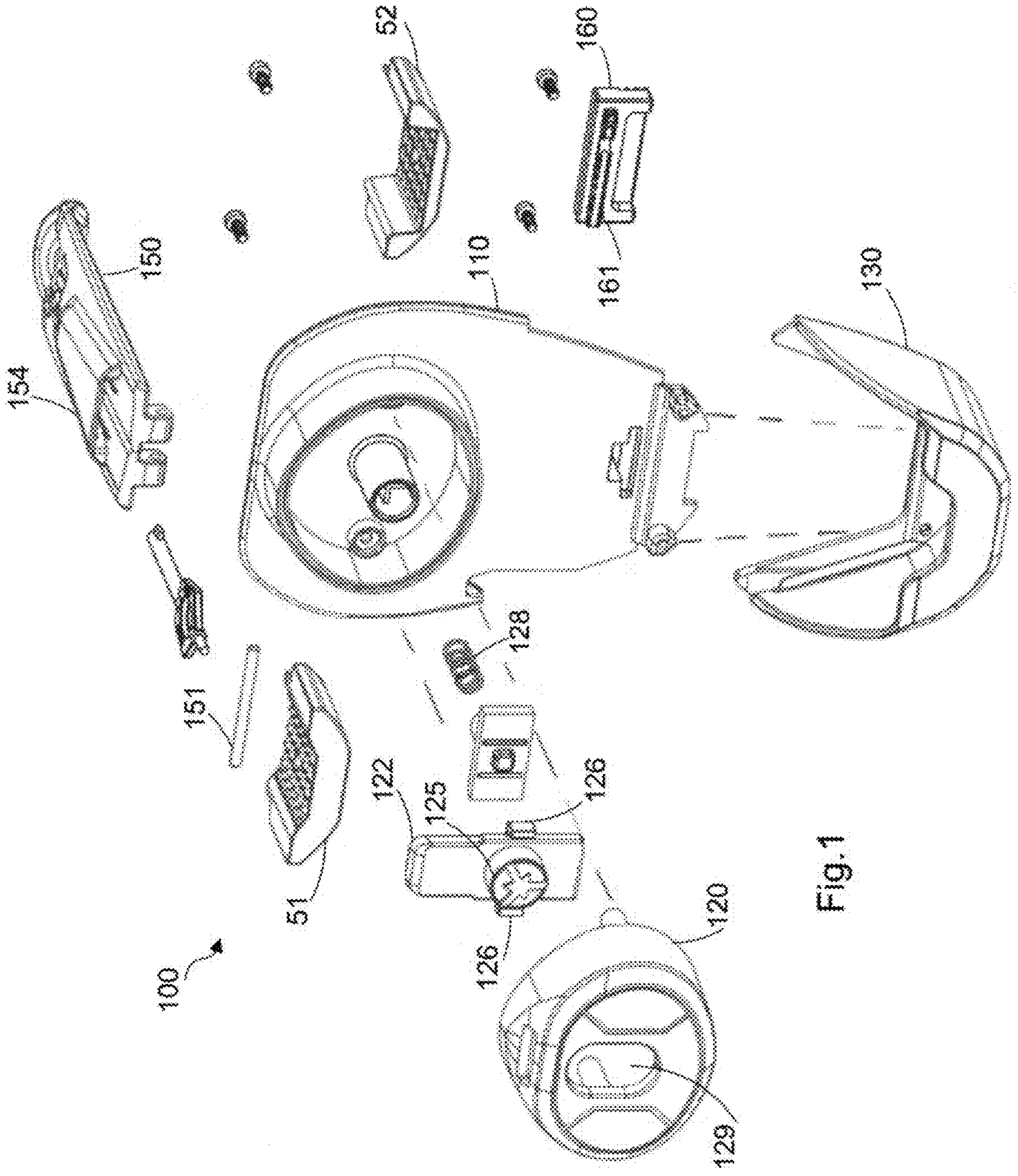
FIG. 1 shows the disassembled components of an exemplary carrying case.
Figure 2:
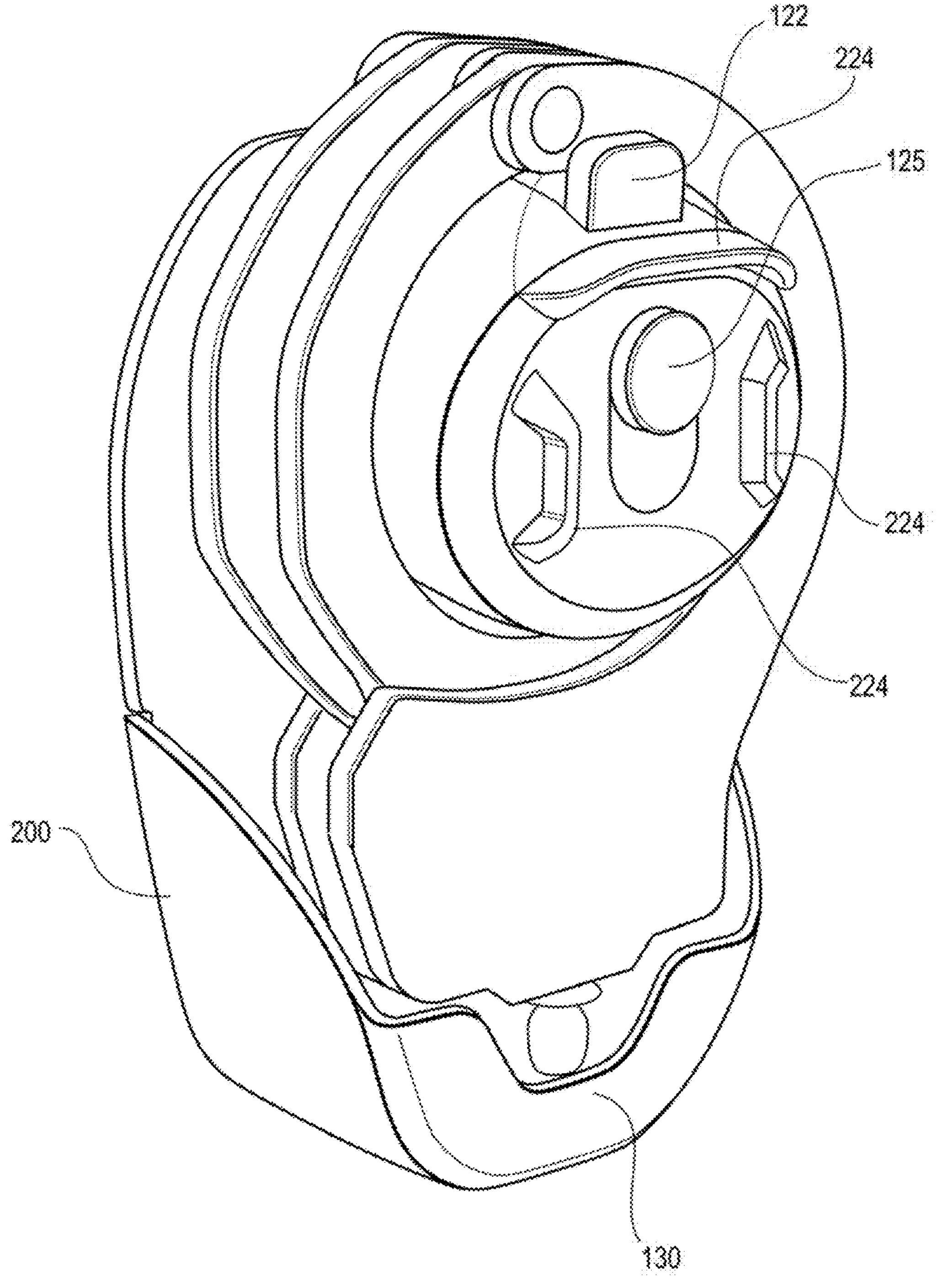
FIG. 2 shows a pair of chain handcuffs inserted into an exemplary carrying case.
Figure 3:
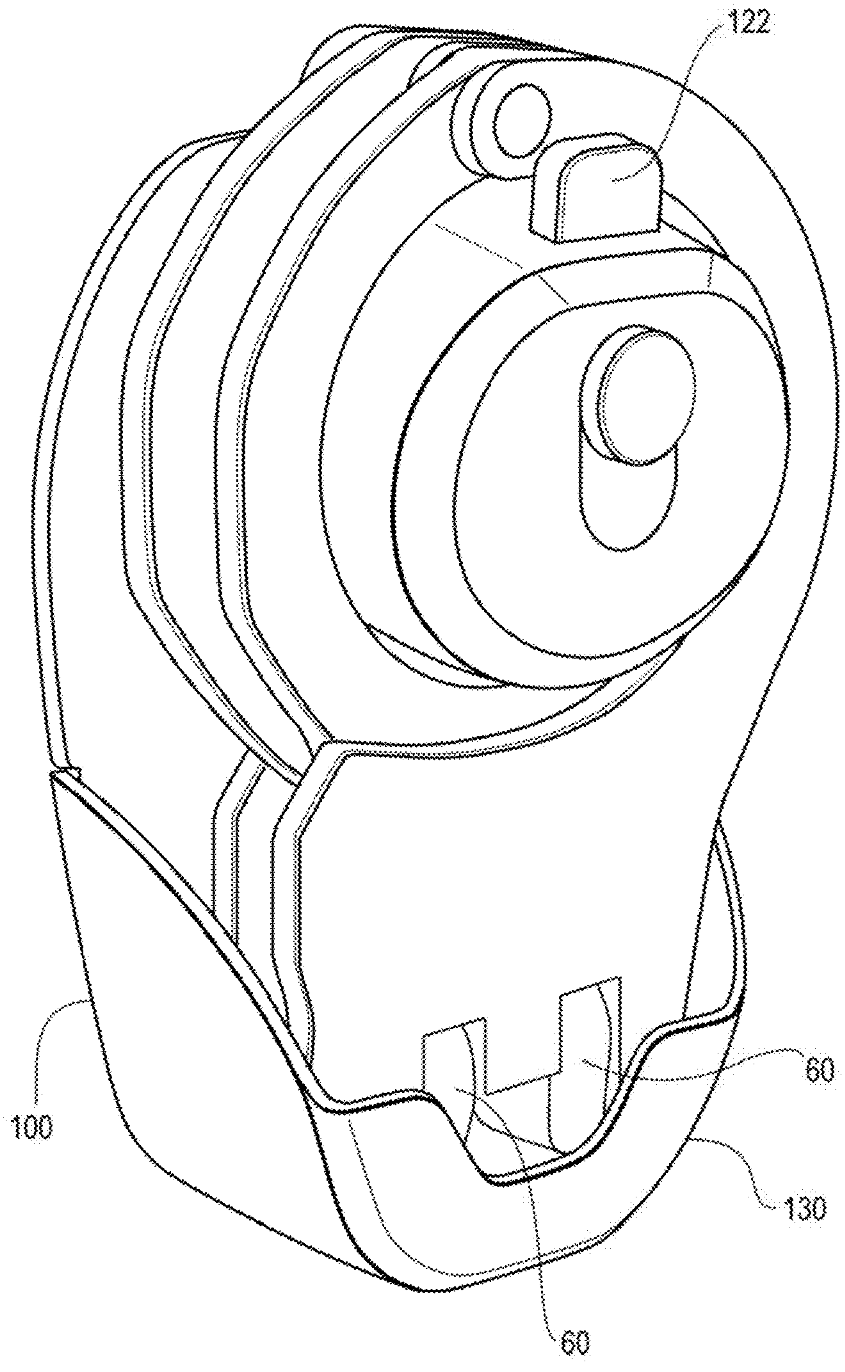
FIG. 3 shows a pair of hinge handcuffs inserted into an exemplary carrying case of FIG. 1.

FIG. 1 shows the disassembled components of an exemplary carrying case 100. It includes two alternative bottom pads 51 and 52, which are interchangeable. As discussed below, bottom pad 51 is shaped and sized for accommodating chain handcuffs, and bottom pad 52 is shaped and sized for accommodating hinge handcuffs. FIG. 2 shows a pair of chain handcuffs inserted into a carrying case 200 that has an alternative retention protrusion 220 as discussed below. FIG. 3 shows a pair of hinge handcuffs inserted into a carrying case 100, with the hinge handcuffs having two hinge sets 60.

Figure 4:
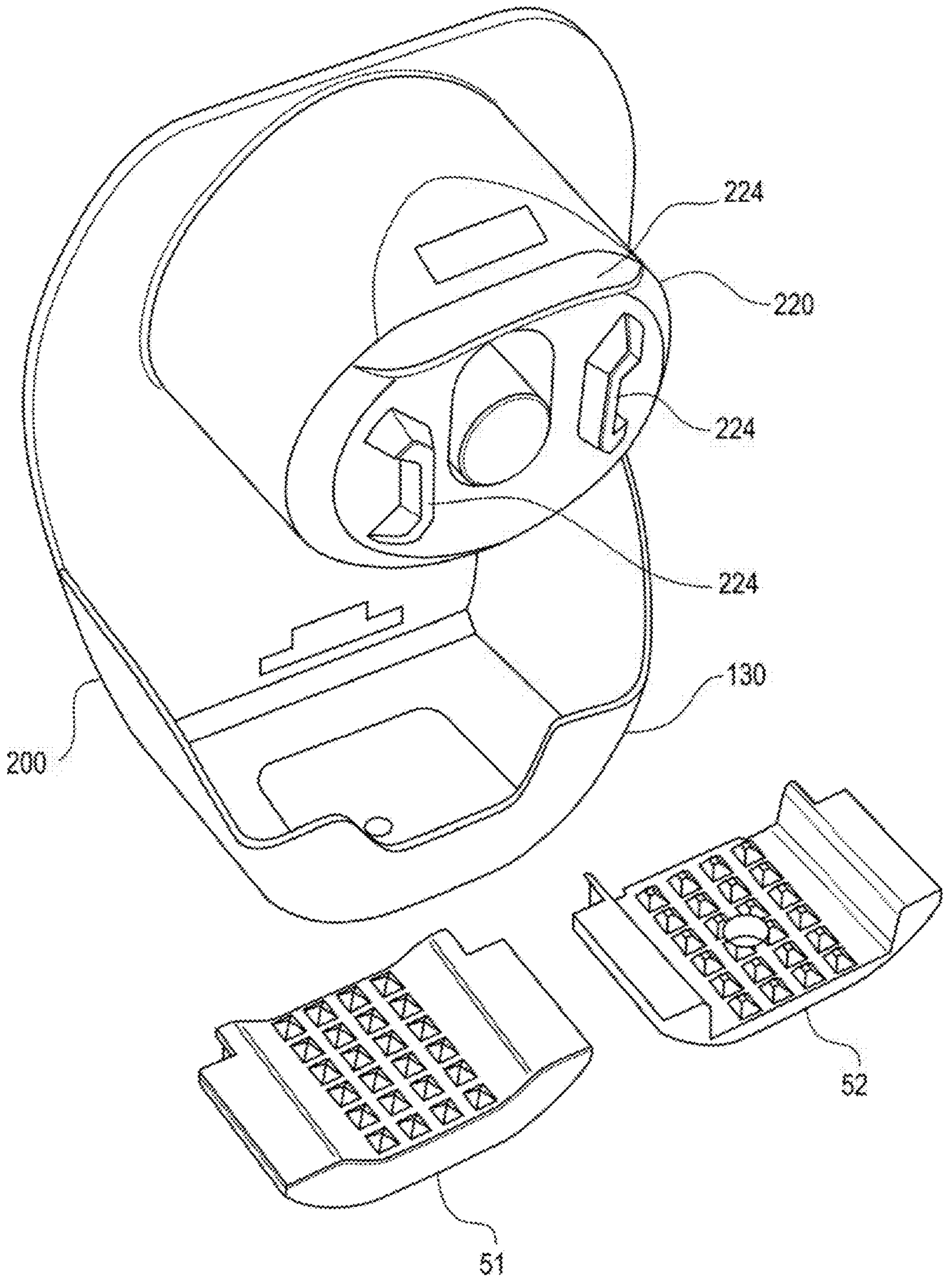
FIG. 4 shows the empty exemplary carrying case of FIG. 2 and two alternative bottom pads and which have not been inserted into the carrying case.

FIG. 4 shows an empty carrying case 200 and two alternative bottom pads 51 and 52 which have not been inserted into the carrying case 200.

As best seen in FIG. 1, an exemplary carrying case 100 comprises a rigid frame 110. A front side of the frame 110 is adapted to receive a pair of two handcuffs.

In the example of FIG. 1, a retention cup 130 is affixed to the bottom of the front side of the frame 110. The retention cup 130 is structured and dimensioned to receive a coupler of a pair of two handcuffs, with the two handcuffs being positioned overlappingly adjacent to each other with a side of one of the two handcuffs facing and touching a side of the other one of the two handcuffs (as seen, for example, in FIGS. 2 and 3). The retention cup 130 is structured and dimensioned to block removal of the coupler from the retention cup 130 except in a direction substantially toward the top end of the carrying case 100 or 200, as seen, for example, in FIGS. 1-4.

In the example of FIG. 1, a retention protrusion 120 is affixed to the top of the front side of the frame 110. The retention protrusion 120 is structured and dimensioned to receive and be surrounded by oval portions of each one of a pair of two handcuffs that are positioned overlappingly adjacent to each other (as seen, for example, in FIG. 3). In the example of FIG. 1, the retention protrusion 120 is substantially oval-shaped as best seen in FIG. 1.

In some examples, the frame 110, the retention cup 130, and the retention protrusion 120 or 220 are precision molded from a high strength polymer.

In some examples, the inside of the retention cup 130 comprises a bottom pad 51 or 52, that may be removable. The bottom of bottom pad 51 or 52 is shaped and sized to fit securely adjacent an inner surface of the retention cup 130 into which the bottom pad 51 or 52 is inserted. The top of bottom pad 51 is broad enough to accommodate two chain links of a pair of chain handcuffs, regardless of how the two chain links lie in the retention cup 130 when the oval portions of the two handcuffs of a pair of chain handcuffs are received over the retention protrusion 120 or 220. The top of bottom pad 52 is substantially U-shaped to accommodate two hinge sets 60 when the oval portions of the two handcuffs of a pair of hinge handcuffs are received over the retention protrusion 120 or 220. The base pad 51 or 52 cushions, and diminishes any rattle resulting from, a pair of two handcuffs being carried in the carrying case 100 or 200. In some examples, removable bottom pads 51 and 52 are interchangeable, so that either one can be inserted in the same carrying case 100 or 200 to optimize that carrying case 100 or 200 for chain handcuffs or for hinge handcuffs, respectively. In some examples, bottom pad 51 or 52 is molded from silicon.

In some examples, the carrying case 100 or 200 comprises a retaining mechanism 122 that impedes removal of a pair of two handcuffs from the carrying case 100 or 200 unless the retaining mechanism 122 is released. In some examples, the retaining mechanism 122 is positioned in the retention protrusion 120 or 220. In some examples, the carrying case 100 or 200 comprises a lock switch 125 that controls whether the retaining mechanism 122 is in an extended position impeding removal of a pair of two handcuffs from the carrying case 100 or 200 (as seen, for example, in FIGS. 2 and 3), or whether the retaining mechanism 122 is in a retracted position not impeding removal of a pair of two handcuffs from the carrying case 100 or 200 (as seen, for example, in FIG. 4). In some examples, the lock switch 125 is positioned in the retention protrusion 120 or 220. In the example of FIG. 1, the lock switch 125 is integral with the retaining mechanism 122, and the lock switch 125 is accessible through an opening 129 on the front of the retention protrusion 120.

Figure 5:
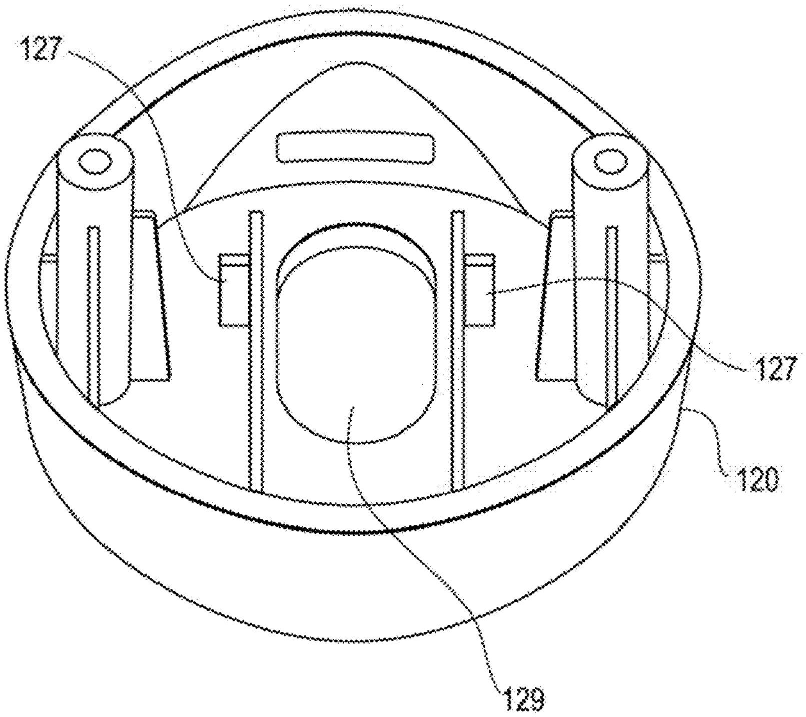
FIG. 5 is a perspective view of the inside of the front surface of a retention protrusion that engages with a lock switch of an exemplary embodiment.

The retaining mechanism 122 is in the extended position when the lock switch 125 is in a locked position, and is in the retracted position when the lock switch 125 is in an unlocked position. As illustrated in the example of FIG. 1, projections 126 on opposite sides of the lock switch 125 keep the lock switch 125 depressed when in the unlocked position, and allow the lock switch 125 to slide up to a locked position in a single sliding movement, moving the retaining mechanism 122 to its extended position. However, when the lock switch 125 is in the locked position, spring 128 is biased to push the lock switch 125 out so that the projections 126 engage recessions 127 on the inside of the front surface of retention protrusion 120 or 220 (as shown in the example of FIG. 5), and block the lock switch 125 from moving down to the unlocked position. Only after depressing the lock switch 125 against the force of spring 128 (thereby disengaging projections 126 from recessions 127) can the lock switch 125 be slid down to the unlocked position, moving the retaining mechanism 122 to its retracted position.

As seen in the examples of FIGS. 1, 6-8 and 10, there is a clip 140 adjoined to the rear side of the frame 110, such as for clipping the carrying case 100 or 200 to one's clothing, for example. As some examples, the clip 140 can be used to attach the case 100 or 200 to a user's belt or to a MOLLE (Modular Lightweight Load-Carrying Equipment) vest. In some examples, the clip 140 is an injection molded polymer.

Figure 6:
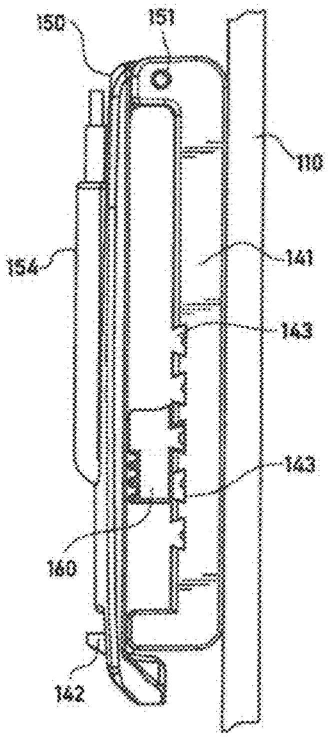
FIG. 6 is an enlarged side view of a clip on the rear side of an exemplary carrying case.
Figure 7:
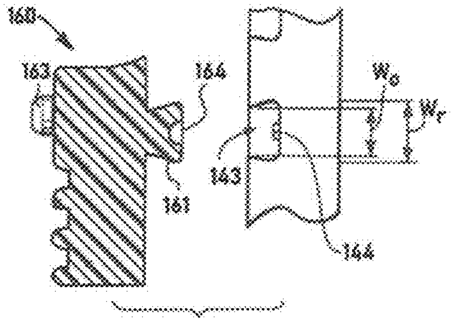
FIG. 7 is an enlarged view of an adjustable spacer shown in FIG. 6, and of a portion of a mounting plate into which the adjustable spacer is installed as shown in FIG. 6.
Figure 8:
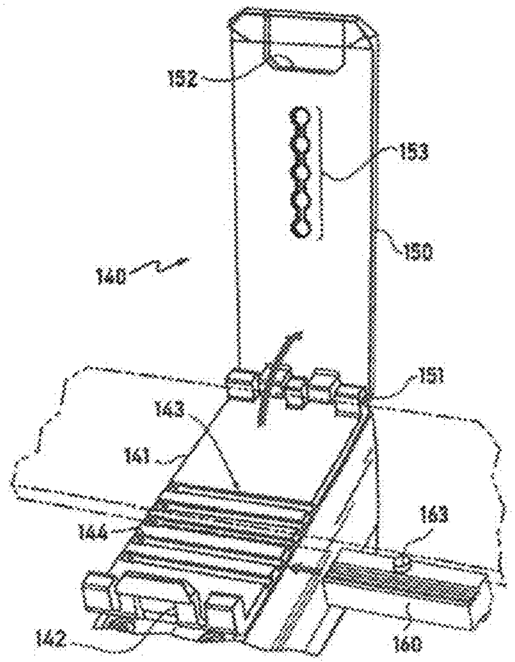
FIG. 8 is a perspective view of the clip of FIG. 6, with the clip open.
Figure 10:
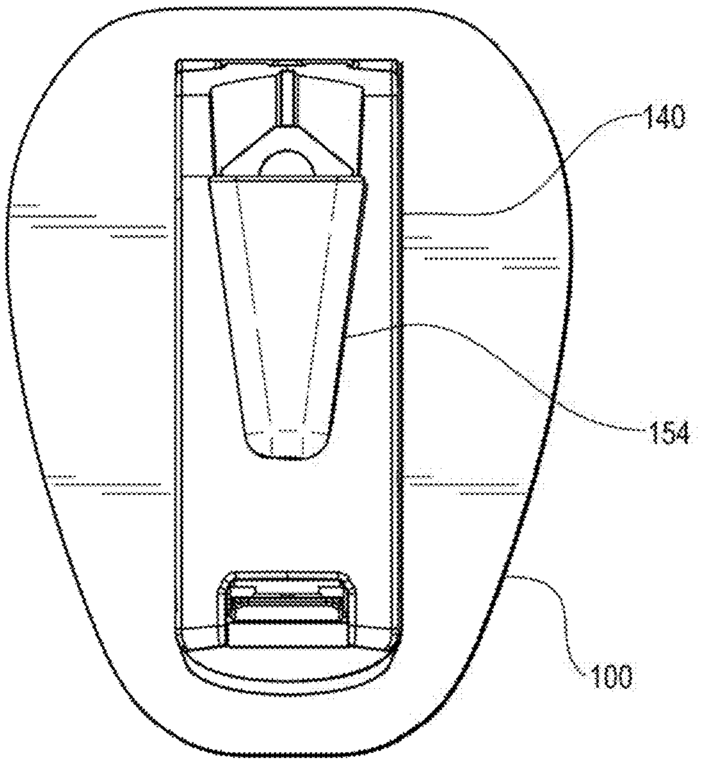
FIG. 10 shows a rear view of an exemplary carrying case.

FIG. 6 is an enlarged side view of the clip 140, FIG. 7 is an enlarged view of an adjustable spacer 160 to accommodate attachment of the clip 140 to a plurality of different size items. For example, spacer 160 may be adjusted to accommodate attachment of the clip 140 to 1.25", 1.50", 1.75", 2.00" or 2.25" belts. FIG. 8 is a perspective view of the clip 140 in an open position. FIG. 10 is a rear view of the carrying case 100. The clip 140 comprises a mounting plate 141 and a cover plate 150 that are joined at a first longitudinal end by a hinge 151. A resilient locking arm 142 that is located at an opposite second longitudinal end of the mounting plate 141 releasably engages with an aperture 152 at the second longitudinal end of the cover plate 150 to lock the clip 140 closed. In some examples, a mounting plate 141 is integral with the frame 110.

In the illustrated example, a number of slots 143 extend across the mounting plate 141, and an adjustable spacer 160 is releasably installed in one of the slots 143. The width $w_r$ at a root of each slot 143 is greater than the width $w_o$ at the opening of each slot 143, and width of an engaging portion 161 of the adjustable spacer 160 varies similarly and is sized to fit snugly into any of the slots 143. The adjustable spacer 160 also is held in place because a dimple 164 at the end of the engaging portion 161 engages with one of the bumps 144 that are located at the blind end of each slot 143, respectively, and because a peg 163 on the top of the adjustable spacer 160 engages with one of the apertures 153 in the cover plate 150.

In some examples, as seen in FIGS. 1, 6 and 10, the cover plate 150 includes a key pocket 154 that is structured and dimensioned to receive a key for the pair of two handcuffs. A top of a key is visible above key pocket 154 in FIGS. 6 and 10.

Figure 9:
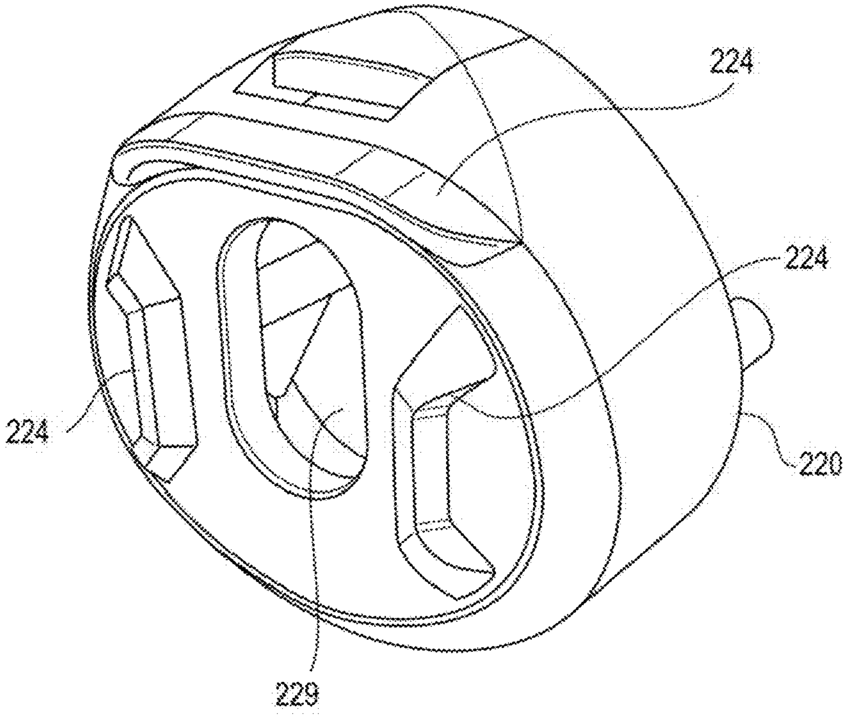
FIG. 9 is a perspective view of an outer surface of the retention protrusion of the embodiment of FIG. 2.

FIG. 9 shows an alternative retention protrusion 220, as illustrated in the examples of FIGS. 2 and 4. A lock switch can extend through opening 229 in retention protrusion 220. The outside of the front surface of retention protrusion 220 includes a plurality of raised portions 224 that extend higher than the lock switch when the lock switch is in the locked position. This inhibits inadvertent depression and sliding of a lock switch and, consequently, inadvertent moving of a retaining mechanism to its retracted position.

It will be understood that the disclosed carrying case for a pair of two handcuffs can be modified without departing from the teachings of the invention. Accordingly, the scope of the invention is only to be limited as necessitated by the accompanying claims.

What is claimed is:

1. A case carrying a pair of two handcuffs, each one of the two handcuffs comprising a lockset portion and an oval portion comprising a bow rotatably mounted between two cheek arms for encircling a wrist, the pair of two handcuffs comprising a coupler connecting the respective lockset portions of each one of the two handcuffs to each other, the case comprising:

a rigid frame having opposing first and second ends;

the first end receiving the coupler, with the two handcuffs being positioned overlappingly adjacent to each other with a side of one of the two handcuffs facing and touching a side of the other one of the two handcuffs;

the second end receiving the oval portions of the two handcuffs; and the second end comprising a retaining mechanism that impedes removal of the pair of two handcuffs from the case unless the retaining mechanism is released.

2. The case of claim 1, the first end comprising a retention cup receiving the coupler, the retention cup blocking removal of the coupler from the retention cup except in a direction substantially towards the second end.

3. The case of claim 2, the first end further comprising a base pad in the retention cup.

4. The case of claim 3, the base pad having a bottom and a top, the bottom shaped and sized to fit securely adjacent an inner surface of the retention cup into which the base pad is inserted, and the top being broad enough to accommodate the coupler if the coupler comprises two chain links regardless of how the two chain links lie in the retention cup when the oval portions of the two handcuffs are received in the second end of the case.

5. The case of claim 3, the base pad having a bottom and a top, the bottom shaped and sized to fit securely adjacent an inner surface of the retention cup into which the base pad is inserted, and the top being substantially U-shaped to accommodate the coupler when the oval portions of the two handcuffs are received in the second end of the case if the coupler comprises two hinge sets.

6. The case of claim 3, the base pad being removable.

7. The case of claim 1, the second end comprising a retention protrusion receiving the oval portions of the two handcuffs, the retention protrusion surrounded by the oval portions of the two handcuffs.

8. The case of claim 7, the retention protrusion being substantially oval-shaped.

9. The case of claim 1, further comprising a lock switch that controls whether the retaining mechanism is in an extended position impeding removal of the pair of two handcuffs from the case, or whether the retaining mechanism is in a retracted position not impeding the removal of the pair of two handcuffs from the case.

10. The case of claim 9, wherein the retaining mechanism is in the extended position when the lock switch is in a locked position;

the retaining mechanism is in the retracted position when the lock switch is in an unlocked position;

the lock switch can be moved from the unlocked position to the locked position in a single sliding movement; and the lock switch can be slidingly moved from the locked position to the unlocked position only after the lock switch is depressed.

11. The case of claim 9, the second end comprising a retention protrusion receiving the oval portions of the two handcuffs, the retention protrusion surrounded by the oval portions of the two handcuffs, and the lock switch being positioned in the retention protrusion.

12. The case of claim 11, an outer surface of the retention protrusion comprising at least one raised portion that extends higher than the lock switch when the lock switch is in the locked position.

13. The case of claim 1, the frame having opposite first and second sides, the first side receiving the pair of two handcuffs.

14. The case of claim 13, further comprising a clip, the clip adjoining to the second side of the frame.

15. The case of claim 14, the clip comprising an adjustable spacer to accommodate attachment of the clip to a plurality of different size items.

16. The case of claim 14, the clip comprising a key pocket receiving a key for the pair of two handcuffs.

* * * * *